United States Patent [19]

Kuemmel et al.

[11] 4,426,149

[45] Jan. 17, 1984

[54] PHOTOCOPIER SCANNING DRIVE SYSTEM

[75] Inventors: Klaus Kuemmel; Gerhard Klapettek, both of Giessen; Siegfried Schneider, Biebertal, all of Fed. Rep. of Germany

[73] Assignee: Gestetner Manufacturing Limited, London, England

[21] Appl. No.: 326,063

[22] Filed: Nov. 30, 1981

[30] Foreign Application Priority Data

Dec. 2, 1980 [GB] United Kingdom ............... 8038559

[51] Int. Cl.³ ............................................. G03G 15/00
[52] U.S. Cl. ..................................... 355/8; 355/14 R; 355/14 C; 355/55; 355/56
[58] Field of Search ............. 355/8, 14 R, 3 R, 3 SH, 355/14 SH, 14 C, 55, 56; 271/171

[56] References Cited

U.S. PATENT DOCUMENTS

| | | |
|---|---|---|
| 3,351,831 | 11/1967 | Hemphill et al. |
| 4,080,062 | 3/1978 | Torigai et al. ...................... 355/8 X |
| 4,126,389 | 11/1978 | Ikeda et al. ........................ 355/8 X |
| 4,217,052 | 8/1980 | Tani et al. ............................. 355/8 |

FOREIGN PATENT DOCUMENTS

| | | |
|---|---|---|
| 2735679 | 2/1979 | Fed. Rep. of Germany . |
| 2951199 | 6/1980 | Fed. Rep. of Germany ...... 271/171 |
| 3015820 | 11/1980 | Fed. Rep. of Germany . |
| 2335869 | 7/1977 | France . |
| 1544269 | 4/1979 | United Kingdom . |

*Primary Examiner*—A. C. Prescott
*Attorney, Agent, or Firm*—Fleit, Jacobson, Cohn & Price

[57] ABSTRACT

A photocopier scanning system has a scanning member (which may be the scanning lamp, a scanning mirror, a scanning slit, or a document carrier) on a scanning system powered by a d.c. drive motor synchronized to the rotation of the a.c. main drive motor for the other components of the photocopier. A variable programmer using a phase locked loop control circuit including pulse encoders slaved to the motors maintains strict synchronization between the scanning drive motor and the main drive motor with an appropriate proportionality dependent upon the image magnification/reduction ratio of the photocopier. The optical system may include a movable zoom lens element which gives infinitely variable selection of the magnification/reduction ratio, and which can readily be connected to the programmer to achieve an infinitely variable proportionality between the speeds of the scanning drive motor and the main drive motor to suit any such magnification/reduction ratio. Also the output of the exposure lamp is variable in accordance with the magnification/reduction ratio.

24 Claims, 3 Drawing Figures

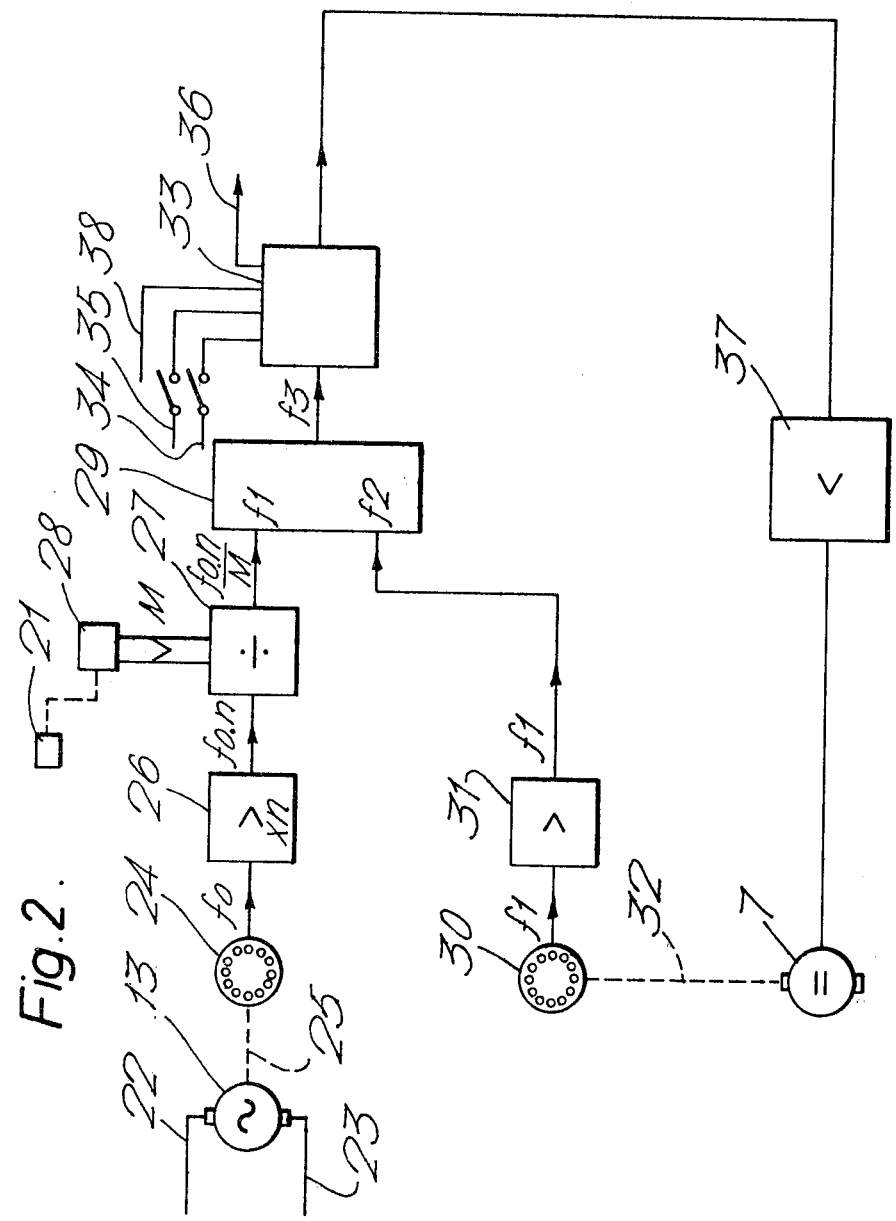

PHOTOCOPIER SCANNING DRIVE SYSTEM

DESCRIPTION

The present invention relates to a photocopier including a scanning system which may include a document carriage, at least one scanning mirror carriage, a scanning lamp carriage, a scanning lens carriage or a scanning slit carriage, driven in synchronisation with the movement of the photoconductor past the exposure station. The photocopier of this invention offers a range of different (infinitely variable or stepped) image magnification/reduction ratios.

In a photocopier, the image on an original document is traditionally scanned by a moving line scan which traverses the original from one edge to an opposite edge and which produces, on a photoconductor (which may be a photoconductor drum, or a photoconductor web, or a sheet of sensitised copy paper coated with a photoconductive layer) an image pattern corresponding to the image of the scanned original document. In such machines, the photoconductor is in motion during scanning and consequently the movement of the scanning carriage must be carefully registered with the movement of the photoconductor in order to provide a clear and distinct image.

Traditionally the movement of such a scanning system has been mechanically linked to movement of the photoconductor, by means of chain-drives or other analogous devices.

U.S. Pat. No. 3,351,831 discloses a photocopier employing the feed of an original microfilm and/or copy paper sheets powered by a slave motor synchronised to a main drive motor powering the photoconductor drum. The synchronisation depends upon comparison of current signals proportional to the speeds of rotation of both master and slave motors, and adjusts the current supply to the slave motor(s) to maintain a zero output for the comparison operation. This provides for a single speed proportionality ratio.

Various prior attempts have relied upon either (a) mechanical gear boxes to synchronise the scanning system with the movement of the photoconductor, (see for example, DOS Nos. 2735679 and 3015820 and French Patent Publication No. 2335869) or (b) flash scanning of a whole frame image "on the run" (see, for example, British Patent Specification No. 1,544,269).

However, according to the present invention we provide a photocopier including a main drive motor driving the image-developing and photoconductor-moving components, a scanning system carrying a scanning member to effect scanning of an original, a scanning system drive motor for driving said scanning system, means for synchronising the movement of said scanning system drive motor with the movement of said main drive motor, and variable programme control means for varying the speed of said scanning system drive motor to vary the ratio of proportionality of said movement of the scanning system to the movement of the photoconductor. Since the movement of the photoconductor is related to operating parameters such as charging corona potential and cleaning exposure and should therefore be maintained at a given value, it is very advantageous to be able to change the ratio of the speeds of the scanning member and the main drive by varying the speed of the scanning system, as in the case of the photocopier of this invention without interfering with the speed of movement of the photoconductor.

Furthermore it is very advantageous to be able to carry out a line by line scan instead of flash comparing a whole frame at a time.

In order that the present invention may be more readily understood the following description is given, merely by way of example, with reference to the accompanying drawings in which:

FIG. 2 is a block diagram of the coated system for the scanning system drive motor.

Figure 1:
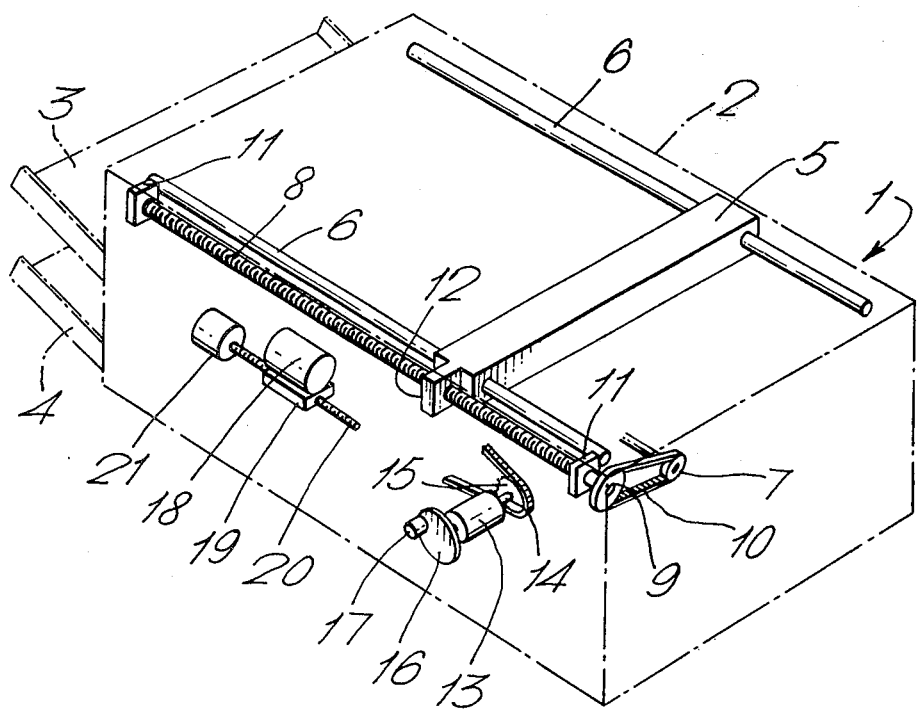
FIG. 1 is a perspective view, in schematic form, showing the arrangement of the various components of the scanning drive and the optical system of a photocopier in accordance with the present invention.

The photocopier 1 in accordance with the present invention has a casing 2 within which the conventional components are housed, although only some of these components can be seen in FIG. 1. The lefthand side of the casing 2 has means for receiving two copy paper cassettes 3 and 4 intended for different sizes of paper, for example one for A4 paper and one for B4 paper size.

The present invention is concerned with the drive for the scanning system and in the preferred form of the photocopier the scanning system includes two mirror carriages one of which also carries the exposure lamp. However, in FIG. 1 the scanning system is schematically illustrated as one scanning mirror carriage 5 slidable along two parallel guide rails 6. Although in this case the scanning system carries mirrors of the optical system and the exposure lamp, the scanning system may instead carry some other scanning member such as a lens, an exposure slit, or a movable support platen to traverse the original document past a stationary scanning head.

The scanning system is driven from a d.c. scanning system motor 7 by means of a lead screw 8. In this case one end of the lead screw has a pulley 9 connected to the output shaft of the motor 7 by way of a toothed belt 10. Alternatively, the motor 7 may drive the lead screw 8 directly. The lead screw 8 is at each end supported in respective bearings 11 and threadedly engages a nut 12 which constitutes a projection from one end of the scanning carriage 5.

In this case, the lead screw 8 has a twin-start screw thread of constant pitch and is arranged such that rotation of the lead screw 8 in one direction, by means of the motor 7 and the toothed belt 10, will cause the scanning system to move along the guide rails 6 in a scanning direction (i.e. leftwardly as viewed in FIG. 1) whereas rotation of the lead screw 8 in the reverse direction (by reversal of the drive motor 7) will cause the return movement of the scanning system along the guide rails 6.

As an alternative possibility, the lead screw 8 may have a single thread extending from the righthand end, (as viewed in FIG. 1) to the opposite end and then returning with reversed hand (and possibly with a coarser pitch to ensure a return movement faster than the forward scan movement) back to the righthand end of the lead screw, so that continued rotation of the lead screw in a single direction will effect both scanning and return movements of the scanning system. The higher speed of return movement may be achieved by having the pitch of the return portion of the thread 2.5 times greater than the pitch of the scanning portion.

The scanning system is supported by the two guide rails 6 so as always to remain parallel to the orientation shown in FIG. 1 and so as to slide smoothly along its path of travel.

Although FIG. 1 omits the other various components of the photocopier, for example the copy paper feed rollers, the photoconductor drum, the charging corona, the transfer corona, the developer unit, the fuser and the copy paper delivery rollers, it does show the main drive motor 13 (which may be a.c. or d.c.) from which each of these components is driven by way of a drive shaft 14 and a chain sprocket 15. The main drive motor 13 has connected thereto a pulse encoder disc 16 having radially extending slits (not shown) which enable a light source and a photosensor 17 to be used to generate synchronisation pulses in response to rotation of the drive motor 13 and hence to the simultaneous movement of the various copier components which are not shown in the drawings.

The arrangement in the embodiment shown in FIG. 1 is such that although in practice there may be some very minor variations in the operating speed of the main drive motor 13, this motor will be energised with mains supply and consequently will operate at a substantially constant speed by virtue of the constant mains frequency. However, any variations in the speed of the a.c. main motor 13 (for example due to change in drag conditions on the various photocopier components driven from the sprockets 15) will be felt in the changing pulse repetition frequency of the pulses generated by the photosensor 17 associated with the disc 16.

This particular photocopier 1 is one having a variable reduction photocopy facility by virtue of a zoom lens comprising a movable lens element 18 on a carriage 19 driven from a further lead screw 20 actuated by a stepping motor 21 in response to an input signal requesting a particular reduction ratio.

It is envisaged that the zoom lens optical system shown in FIG. 1 can be used either for a photocopier having a fixed reduction ratio (for example giving reduction ratios stepping down from one DIN sheet size to another specified DIN sheet size) or able to give a reduction ratio which can be selected by a dial or digital keyboard mechanism. In that case the selection of a particular reduction ratio will signal actuation of the stepping motor 21 to drive the lens carriage 19 to the new position required in order to give the reduction ratio selected. In both cases the exposure lamp output is altered by, for example, changing the lamp power input or modulating the luminous output using a further system such as a variable polarising filter system.

Furthermore, the zoom lens may be arranged such that the image may be not only reduced in size, but alternatively magnified, i.e. increased above a 1:1 size ratio. To achieve this facility the movable element 18 of the zoom lens is arranged such that at a point somewhere between the extremes of movement the movable lens element gives a 1:1 image ratio whereas on opposite sides of that intermediate position the image on the developed and fused image on the copy sheet will be magnified or reduced in size with respect to the image on the original document. Also, during such alteration of the image size ratio, the output power for the exposure lamp will be adjusted accordingly.

The motor 7 used to drive the lead screw 8 is preferably a d.c. "flat motor" (e.g. obtainable from Matsushita Electrical Company under Part No. SSW996X). This is a permanent magnet motor having a squashed winding with a substantially coreless armature. As an alternative, a printed circuit motor can be used. The SSW996X flat motor 7 already has incorporated therein a pulse encoder disc and sensor which enables the rotation of the motor 7 to be monitored by suitable processing circuitry. The pulses may be generated by a mechanism similar to that of the photosensor 17 and disc 16.

Although the disc 16 is indicated above as being provided with a plurality of radial slits, it is possible instead for the disc to have a plurality of holes formed near its periphery so that, as the disc rotates, the light path from a light source to a light sensor between which the disc holes pass is intermittently broken and completed so as to provide a pulsed output at the photosensor. Alternatively, instead of holes or slits, the disc may include a plurality of reflective and non-reflective alternating areas so that light may be thrown back intermittently from a light source back onto a sensor on the same side of the disc. Yet another alternative is one where the disc is generally opaque but has a plurality of translucent or transparent regions regularly arranged around its periphery, by a photographic process. A further possibility is for some magnetic pulsing system to be incorporated, for example using magnets on the disc and a stationary nearby device responsive to changes in magnetic field in order to convert the disc motion into pulsing. Any other conceivable pulsing mechanism can be used in order to provide an electric output signal with a pulse repetition frequency locked to the rotation of the main drive motor 13 and/or the carriage drive motor 7.

It is not essential for the scanning drive motor to be a flat motor incorporating its own pulsing coder disc as shown at 7 in FIG. 1, but this is preferable because the space available at the end of the casing 2 of the photocopier is limited and the flat motor SSW996X is a particularly convenient mechanism for providing the necessary drive torque without being bulky in its axial extent.

FIG. 2 shows a block diagram of the circuitry controlling the scanning drive motor 7 for synchronous operation with the main drive motor 13. As can be seen from FIG. 2, the main drive motor 13 is energised by mains supply conductors 22 and 23 usually at 50 Hz (60 Hz) mains frequency. The mechanical connection between the main drive motor 13 and the pulse encoder 24 (corresponding to the disc 16 and photosensor 17 in FIG. 1) is depicted by a broken line connection 25. The output signal from the pulse encoder 24 is at a frequency $f_0$ and is applied as input to an amplifier and frequency multiplier 26 which gives an output $f_0 \cdot n$. This output from the amplifier multiplier 26 is then applied to a programmable frequency divider 27 whose programming input is from a controller 28 which also actuates the zoom lens drive motor 21 to select the magnification/reduction ratio of the original image area:copy image area. As will be readily appreciated, for reducing the size of the image it will be necessary to speed-up the travel of the scanning member (which may be either the mirror(s) as in the embodiment of FIG. 1, or a lamp or scanning slit, or alternatively may be a document-carrying platen) with respect to the speed of travel of the photoconductor. For this reason, when the operator selects a different magnification/reduction ratio the programme of the frequency divider 27 is automatically selected to a different predetermined programme.

The output signal from the programmable divider 27 represents a frequency $f_0 \cdot n/M$ and is applied as one input $f_1$ to a frequency and phase comparator 29.

The other input $f_2$ to the frequency and phase comparator 29 is representative of the output signal from the carriage drive motor pulse encoder 30 (corresponding to the pulse encoder incorporated in the flat motor 7 of FIG. 1). As can be seen from FIG. 2, the output frequency signal $f_1$ from the pulse encoder 30 is applied as input to an amplifier 31 whose output, again having a frequency $f_1$, is then applied as the $f_2$ input to the frequency and phase comparator 29.

The mechanical connection between the scanning drive motor and the scanning drive motor pulse encoder 30 is illustrated by the broken line 32 in FIG. 2. However, in the FIG. 1 embodiment the items 7, 32, 30 will all be located in the "flat motor" driving the toothed belt 10.

The output frequency $f_3$ from the frequency and phase comparator 29 is applied as input to a direction control unit 33 having three control inputs two of which are schematically illustrated by switches 34 and 35 in FIG. 2 and are indicative of the copy sheet length selected. The direction control unit 33 also has an output 36 which can be used for actuating an indicator to show when the scan movement is completed and the return movement begins, in order, for example, to indicate that exposure is complete and the copier is ready to accept the next original.

The pulse width modulated output signal from the direction control unit 33 is applied as input to a power amplifier 37 whose pulsed output is applied to the d.c. scanning drive motor 7 to actuate the motor.

The system illustrated in FIG. 2 therefore depicts a phase locked loop control system for the scanning drive motor 7 so as to maintain the rotation of the scanning drive motor 7 in a pre-programmed relationship to the rotation of the non-stabilised rotation of the main drive motor 13.

As indicated above, the programmable frequency divider 27 has a varying divider ratio which depends upon the magnification/reduction ratio represented by the position of the movable lens element 18 of FIG. 1. However, this same magnification/reduction ratio is effective to control the travel of the scanning drive motor 7 in order to ensure that, once the scanning system has moved far enough to scan an area of the entire original which corresponds to the image area on the copy sheet, the direction control unit 33 is immediately energised in the reverse direction in order to commence the return run and to prepare the copier for the next scan movement. For this reason the two switches 34 and 35 on the control inputs to the direction control unit 33 are alternately operated when the cassette selection (i.e. the copy sheet length selection) at the cassettes 3 and 4 is changed. Clearly, for a given magnification ratio then the travel of the scanning drive motor will be longer where the cassette selected is one having a longer copy sheet than is the case where the cassette selected has a shorter copy sheet length. Thus the direction control unit is given a sheet length control signal via the inputs connected to the switches 34 and 35, and an emergency stop signal via input 38.

Figure 3:
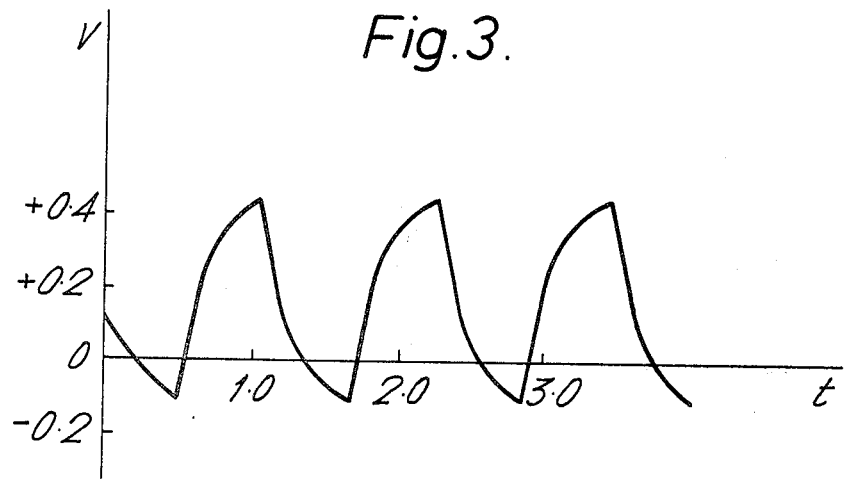
FIG. 3 is a graph showing the voltage applied to the scanning system drive motor.

In order to improve the accuracy of control of the scanning drive motor 7 in response to rotation of the main drive motor 13 sensed by the pulse encoder 24, the output of the direction control unit 33 has a particular wave form, shown in FIG. 3, in which each positive pulse is followed by a brief negative pulse to provide a sharper delineation to the trailing end of the pulse and consequently to improve the accuracy of phase locked control. In FIG. 3 the pulse amplitude voltage V (volts) is plotted on the ordinate and the time t (milliseconds) is plotted on the abscissa.

The copier also includes as a preferred feature an emergency stop facility which ensures that the movement of the scanning system is never likely to bring the carriage(s) dangerously close to the position of the movable lens element 18. Although the arrangement of the scanning system 5 and lens element 18 shown in FIG. 1 is such that it does not seem likely for impact to occur, it should be appreciated that the layout illustrated in FIG. 1 is somewhat schematic in form and that the scanning system 5 will in practice move towards and away from the lens element 18. This emergency stop facility may incorporate an additional light source and photosensor to detect attainment of a given "danger position" of the scanning system 5 in relation to the movable lens element 18 and this will immediately actuate an "emergency stop" facility by which the motor 7 is deenergised and a brake, preferably an electric magnetic brake (not shown), is applied. Alternatively, for an emergency stop the d.c. scanning drive motor 7 may be short-circuited. In this case the motor generates its own back e.m.f. and has a self-braking action.

In order to enhance the emergency stop action the drive motor used for the scanning drive is preferably of very small inertia. This is particularly the case with a "flat motor" of the SSW996X type supplied by Matsushita Electrical Company, and also by the alternative printed circuit armature motor mentioned above. Another advantage of low inertia forces for the d.c. scanning drive motor 7 is that this reduces the time constant of the control loop and avoids hunting or overshooting which will of course give rise to inaccuracies in the image on the copy sheet.

It will be appreciated from the above description that the independent d.c. scanning drive motor 7, with phase locked loop control responsive to rotation of the a.c. main drive motor 13 and incorporating in the control loop the programmable frequency divider 27, provides an arrangement analogous to an "electronic gearbox" for the lead screw. The advantage of this arrangement is that provided the programming of the frequency divider 27 allows for an infinite number of different programmes depending upon the particular magnification ratio selected (where this is not simply expressed in terms of a limited number of predetermined transformations from one DIN sheet size to another) the gearing ratio between the main drive and the scanning drive is infinitely variable within a specified range. With this particular facility it is advantageous for the direction control unit to be able to give a return motion such that the maximum possible speed of the return movement is achieved (for example by applying a continuous negative voltage to the motor). In practice limits may be placed on the speed of return movement, for example in order to avoid excessive shock as the scanning system runs down at the end of its travel. However, since in practice some overrun of the scanning drive motor 7 will occur, it is to be expected that the scanning system 5 will slow down progressively at the end of its run.

As can be seen from FIG. 3, the positive going pulses have an amplitude (measured across a resistor in series with the flat motor while the flat motor is stationary) of for example 0.45 volts and the negative going pulse portions have an amplitude of $-0.12$ volts. As an example, the scanning drive motor may be operating at a speed of 1,000 r.p.m. in the scan direction. In the reverse direction of movement, the steady voltage applied may be 250 millivolts, but an initial voltage much higher than this is experienced by the drive motor at the start of its return movement. This pulsed forward powering and continuous reverse powering ensures that much faster rotation of the scanning drive motor 7 can be achieved in the reverse direction and, for the example given, a speed of rotation of 2,100 r.p.m. may be experienced in the reverse direction.

In order to avoid possible difficulties due to lack of exact parallelism between the lead screw 8 and the carriage guide rails 6, it is envisaged that the end bearings 11 for the lead screw may be resiliently connected to the frame (not shown) of the photocopier such that transverse movement of the lead screw ends towards and away from the adjacent carriage guide rails 6 is possible, but movement of the lead screw in its axial direction is prevented since this would interfere with the exact registration of movement of the scanning carriage(s) with respect to the main drive components driven from the sprocket 15. Alternatively, the resilient mounting may be provided at the nut 12 so that whereas the nut 12 is held on its carriage so that there is no resilience in the direction parallel to the axis of rotation of the lead screw 8, movement of the nut 12 towards and away from the adjacent carriage guide rail 6 is permitted.

Various other possibilities can be used; for example it is possible for the two end bearings 11 to be mounted such that they are adjustable vertically and horizontally (while being fixed in the axial direction with respect to the lead screw 8). When the photocopier is first commissioned, the bearing 11 at one end of the lead screw can be released to leave it free to move vertically and horizontally while being trapped between two clamping plates for resisting axial movement, and then the scanning drive motor 7 operated to bring the carriage to that particular end of the lead screw. Then, when the nut 12 is alongside the bearing 11 being adjusted, it is possible to clamp that bearing in the position it has now adopted. This ensures that that particular end of the lead screw has the necessary spacing from the adjacent carriage guide rail 6. The other bearing 11 can then be slackened and the carriage drive motor 7 operated slowly to bring the carriage nut 12 alongside that other bearing to cause that bearing to adopt the appropriate position in relation to the adjacent carriage guide rail 6 before being clamped. Once the two bearings have been thus clamped, accurate parallelism has been established.

The purpose of the multiplying action to the amplifier and multiplier 26 shown in FIG. 2 is that this provides an increased pulse frequency $f_0 \cdot n$ for the output signal (originally at frequency $f_0$) from the main drive motor pulse encoder 24. Consequently the accuracy of the control is enhanced. An alternative way of achieving this would be to provide a step-up gearing ratio between the rotation of the a.c. main drive motor 13 and that of the pulse encoder disc 16, for example by means of a toothed belt drive. That has the particular advantage that the multiplication occurs mechanically before the generation of any pulses and consequently any drift in the electronic systems will have a less pronounced effect on the overall signal.

As an alternative to the embodiment shown in the drawings, where the scanning drive motor 7 is driven by a phase locked control loop responsive to rotation of an unstabilised main drive motor 13, the two motors 13 and 7 may be operated in synchronism but without a closed control loop. For example both motors 7 and 13 may have accurate speed stabilisation and the carriage drive motor 7 may be adjustable in speed to suit the magnification/reduction ratio selected. However, no accurate synchronisation of the two motors is necessary if their speeds are independently stabilised.

It will of course be appreciated that the scanning drive system in accordance with the present invention can be incorporated in any type of photocopier, and not simply one in which the image is formed on a photoconductor drum for transfer to plain paper. For example, the photoconductor may be in the form of a continuous web which is charged and then exposed to the light pattern of an original image for subsequent development and transfer to a sheet of plain paper. Alternatively, the photoconductor may be in the form of a sensitised sheet of paper (for example paper coated with a photoconductor such as zinc oxide) on which the image is both formed and developed, before fusing. In each case accurate synchronisation between the scanning of the original and the feed of the photoconductor past the exposure station is necessary and can be achieved using the drive mechanism proposed with this invention.

The control system illustrated in FIG. 2 may incorporate a microprocessor as the direction control unit 33. This provides a particularly compact system in which the various logic functions of varying the travel and rate of travel of the carriage drive motor, and (optionally) varying the exposure lamp output, in response to the copy sheet size selected, and of incorporating the optional emergency stop facility, can be achieved with a most compact system.

We claim:
1. A photocopier including:
 (a) movable photoconductor means;
 (b) means for developing an image on said movable photoconductor means;
 (c) a main drive motor driving the image-developing and photoconductor means;
 (d) scanning carriage means;
 (e) a scanning member carried by said scanning carriage means and effective to carry out scanning of an original;
 (f) a carriage drive motor for driving said scanning carriage means;
 (g) exposure lamp means;
 (h) means for synchronising the operation of said carriage drive motor with the operation of said main drive motor; and
 (i) variable programmer means for varying the speed of said carriage drive motor to vary the ratio of proportionality of said movement of the scanning carriage means to the movement of the photoconductor means.

2. A photocopier according to claim 1, including a nut carried by said scanning carriage means; and a lead screw drivingly connected to said carriage drive motor, said lead screw being threadedly engaged with said traversing nut carried by the scanning carriage means.

3. A photocopier according to claim 1, wherein the optical system of the photocopier includes optical means for varying the size ratio between the original image and the image on the photoconductor, and said programmer means is adjustable to vary the ratio of the speed carriage drive motor to the speed of the main drive motor to conform to the said image size ratio.

4. A photocopier according to claim 3, wherein said optical means comprises a zoom lens having a movable element adjustable to give a range of image size ratios within which range the ratio is infinitely variable.

5. A photocopier according to claim 3 or claim 4, and including alternative copy paper feed means from which copy sheets of different lengths may be advanced for imaging.

6. A photocopier according to claim 5, wherein said alternative paper feed means comprise first and second paper sheet cassette holding means; and further including:
 (a) means selectively activating a particular one of said cassette holding means to advance copy paper therefrom and
 (b) means for signalling the particular cassette holding means selected and effective to vary the ratio of proportionality of movement of the carriage drive motor with respect to that of the main drive motor.

7. A photocopier according to any one of claims 1 through 4, and including respective means for stabilising the speed of said carriage drive motor, and the speed of said main drive motor, said variable programmer means being effective to vary the speed of said carriage drive motor for ensuring synchronisation of said motors.

8. A photocopier according to any one of claims 1 through 4, wherein said variable programmer means includes phase locked control loop means linking said main drive motor and said carriage drive motor for ensuring synchronisation of operation of said carriage drive motor with respect to operation of said main drive motor.

9. A photocopier according to claim 8, wherein said main drive motor is a mains-powered a.c. motor and said carriage drive motor is a d.c. motor energised by a pulse width modulated supply from said phase locked control loop means.

10. A photocopier according to claim 8, wherein said phase locked control loop means includes: first pulse encoder means linked to said main drive motor; second pulse encoder means linked to said carriage drive motor; and frequency comparison means in said phase locked control loop means for generating an output signal effective to maintain synchronisation of the signal frequencies from said first and second pulse encoder means.

11. A photocopier according to claim 10, wherein each of said pulse encoder means comprises a member driven by the associated one of said main drive motor and said carriage drive motor and provided with an irregularity which can be sensed by an adjacent detector.

12. A photocopier according to claim 10, wherein said phase locked control loop means further includes programmable frequency divider means in circuit between said first pulse encoder means and said frequency comparison means, for effecting said variation of the proportionality of operation of said carriage drive motor with respect to that of said main drive motor.

13. A photocopier according to claim 10, wherein said frequency comparison means comprise a frequency and phase comparator.

14. A photocopier according to claim 10, and including means associated with said first pulse encoder means for stepping up the pulse frequency of the signal indicative of rotation of said main drive motor.

15. A photocopier according to claim 14, wherein said pulse frequency stepping up means comprises a step-up geared mechanical connection between said main drive motor and said first pulse encoder means for increasing the pulse rate of said first pulse encoder means with respect to the frequency it would have in the absence of such step-up connection.

16. A photocopier according to claim 12, wherein said frequency stepping up means comprise a frequency multiplier connected in circuit between said first pulse encoder means and said programmable frequency divider means.

17. A photocopier according to claim 12, wherein said phase locked control loop means further includes a direction control unit responsive to the magnification ratio selected and effective to reverse said carriage drive motor after an adjustable length of travel.

18. A photocopier according to claim 17, wherein said carriage drive motor is a d.c. motor and said direction control unit is effective to deliver a pulse width modulated signal comprising a series of positive pulses with each said positive pulse being followed by a negative pulse of smaller amplitude.

19. A photocopier according to claim 18, wherein said direction control unit is effective to deliver said pulse width modulated signal for energising said carriage drive motor in the direction of rotation corresponding to a forward scan movement of said scanning carriage means, and delivers a steady d.c. voltage of negative polarity for driving said carriage drive motor for rotation in the reverse sense corresponding to a return movement of the scanning carriage means.

20. A photocopier according to any one of claims 1 through 4, and including emergency stop means responsive to attainment of a limit position by said scanning carriage, and means for interrupting rotation of said carriage drive motor in response to attainment of said limit position.

21. A photocopier according to claim 20, wherein said means for interrupting the rotation of said carriage drive motor comprises switch means for de-energising said carriage drive motor and brake means for instantaneously applying a braking action to said carriage drive motor.

22. A photocopier according to any one of claims 1 through 4, wherein the output of said exposure lamp means is variable in accordance with said ratio of proportionality.

23. A photocopier according to claim 3, wherein said variable programmer means includes phase locked control loop means linking said main drive motor and said carriage drive motor for ensuring synchronization of operation of said carriage drive motor with respect to operation of said main drive motor, wherein said phase locked control loop means includes: first pulse encoder means linked to said main drive motor, second pulse encoder means linked to said carriage drive motor, and frequency comparison means in said phase locked control loop means for generating an output signal effective to maintain synchronization of the signal frequencies from said first and second pulse encoder means; and wherein said phase locked control loop means further includes programmable frequency divider means in circuit between said first pulse encoder means and said frequency comparison means for effecting said variation of the proportionality of operation of said carriage drive motor with respect to that of said main drive motor; and further including means responsive to the image size ratio of the photocopier for introducing an input signal to said programmable frequency divider means for varying the frequency divider program in response to a change in the image size ratio.

24. A photocopier including:
(a) movable photoconductor means;
(b) means for developing an image on said movable photoconductor means;
(c) a main drive motor driving the image-developing and photoconductor means;
(d) a scanning member carried by said scanning carriage means and effective to carry out scanning of an original;
(e) a carriage drive motor for driving said scanning carriage means;
(f) infinitely variable optical means for varying the magnification of the image developed by said image developing means in relation to the size of said original scanned by the scanning member, said magnification ratio being infinitely variable within a finite range;
(g) means for synchronizing the operation of said carriage drive motor with the operation of said main drive motor; and
(h) variable programmer means for varying the speed of said carriage drive motor to vary the ratio of proportionality of said movement of the scanning carriage means to the movement of the photoconductor means, said variable programmer means including:
(1) first signal transducer means responsive to the position of said mean drive motor;
(2) second signal transducer means responsive to the position of said carriage drive motor;
(3) comparator means having a first signal input connected to said first signal transducer means; and
(4) programmable divider means connected between one of said first and second inputs to said comparator means and the respective one of said first and second signal transducer means for varying the ratio of proportionality of the movements of said main drive motor and said carriage drive motor corresponding to equality of the signals at said first and second inputs to said comparator means.

* * * * *